(12) United States Patent
Chuo (10) Patent No.: US 7,344,468 B2
(45) Date of Patent: Mar. 18, 2008

(54) BICYCLE CRANK SPEED CHANGE SPROCKET MODULE

(76) Inventor: Chin-Chuo Chuo, P.O. Box 36-80, Taichung City (TW)

( * ) Notice: Subject to any disclaimer, the term of this patent is extended or adjusted under 35 U.S.C. 154(b) by 501 days.

(21) Appl. No.: 11/131,681

(22) Filed: May 17, 2005

(65) Prior Publication Data

US 2006/0264281 A1     Nov. 23, 2006

(51) Int. Cl.
*F16H 9/26* (2006.01)
*B62M 1/02* (2006.01)
*B62M 7/00* (2006.01)
*B62M 9/16* (2006.01)

(52) U.S. Cl. .................. 475/182; 280/261; 180/221; 180/231

(58) Field of Classification Search ............... 475/182; 280/260–261; 180/218, 221, 231
See application file for complete search history.

(56) References Cited

U.S. PATENT DOCUMENTS

| | | | | |
|---|---|---|---|---|
| 1,967,141 A | * | 7/1934 | Basso | 475/182 |
| 2,847,878 A | * | 8/1958 | Scanlan | 475/182 |
| 4,715,246 A | * | 12/1987 | Hartmann | 74/594.2 |
| 5,540,456 A | * | 7/1996 | Meier-Burkamp et al. | 280/236 |
| 6,000,707 A | * | 12/1999 | Miller | 280/288.1 |
| 6,468,178 B1 | * | 10/2002 | Mohtasham | 475/277 |
| 2005/0233846 A1 | * | 10/2005 | Green et al. | 474/47 |

* cited by examiner

*Primary Examiner*—Tisha Lewis
(74) *Attorney, Agent, or Firm*—Charles E. Baxley (57) ABSTRACT

A bicycle crank speed change sprocket module includes a fixed star gear having a ratchet around its internal periphery, at least two planet gears and two chains pivotally coupled and axially disposed on both sides of a plate, and the plate is driven to rotate by a crank pedal, and the fixed star gear is engaged to the ratchets on the internal periphery of the planet gear and acted by the planet gear for a faster rotation; a freewheel sprocket freely and rotably coupled to the axle of the crank pedal and disposed proximate to the two chain wheels; and a ratchet disposed on the external periphery of the freewheel sprocket, a chain wound thereon, and the chain is engaged by at lest one chain gear, so that the rotary speed of the chain is much faster than that of the crank pedal for a speed change effect.

17 Claims, 7 Drawing Sheets

BICYCLE CRANK SPEED CHANGE SPROCKET MODULE

BACKGROUND OF THE INVENTION

1. Field of the Invention

The present invention relates to a bicycle freewheel sprocket module, and more particularly to a crank sprocket module that drives a chain to move at a rotary speed faster than that of a crank.

2. Description of the Related Art

Figure 1:
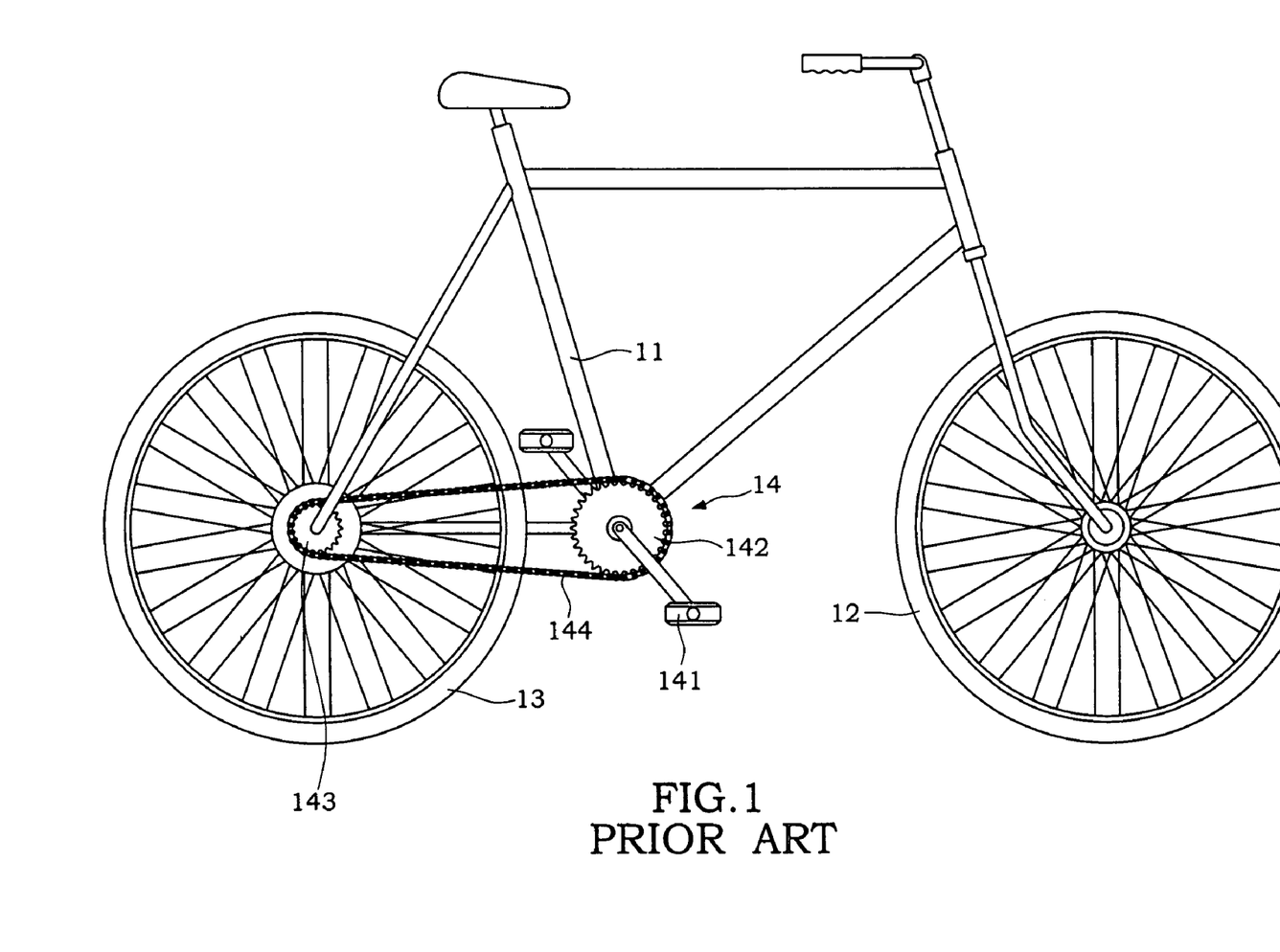
FIG. 1 is a side view of a prior art bicycle.
Figure 2:
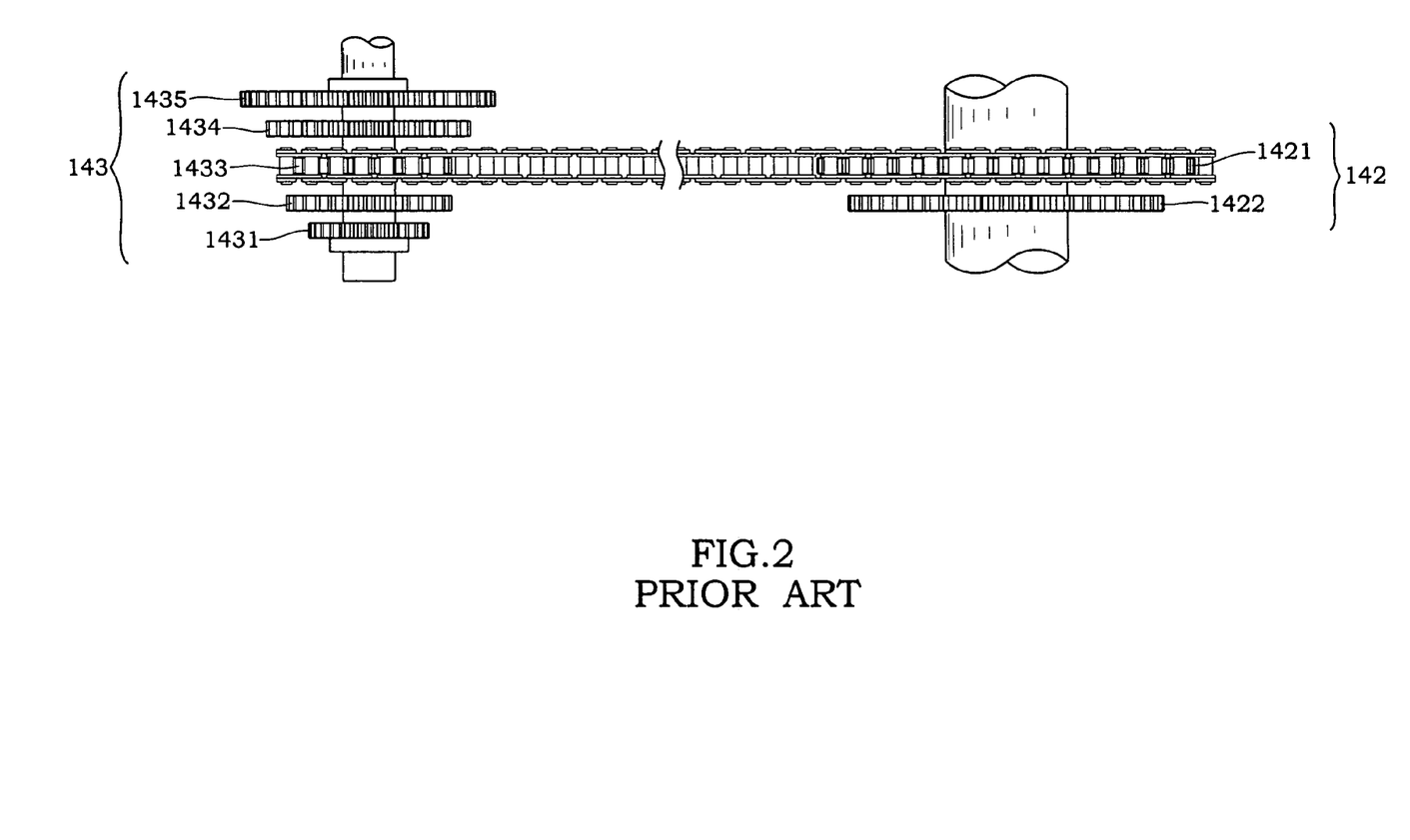
FIG. 2 is a top view of prior art front chain ring and freewheel sprocket.

Reference is made to FIG. 1 for a planar view of the structure of a bicycle. A bicycle generally includes a bicycle frame 11 pivotally connected to a front wheel 12 and a rear wheel 13 and a transmission device 14 that drives the rear wheel 13 to rotate. The transmission device 14 has a crank pedal 11 pivotally coupled at an appropriate position of the bicycle frame 11, a front chain ring 142 linked to the crank pedal 141, a freewheel sprocket 143 installed at the rear wheel 13, and a chain 144 wound around the front chain ring 142 and the freewheel sprocket 143. In FIG. 2, a top view of the design of a prior art speed change sprocket is illustrated. The front chain ring 142 uses a single design for the coaxial connection of two sprockets 1421, 1422 of different sizes, or several sprockets 1431, 1432, 1433, 1434, 1435 are connected to go with the freewheel sprocket 143, and a chain 144 is wound around the different sized sprockets of the front chain ring 142 and the freewheel sprocket 143 for a speed change effect.

The front chain ring 142 acted by the foregoing crank pedal 11 is technically related to the present invention. To allow the front chain ring 142 to have the speed change effect, the prior art will connect the front chain ring 142 and the crank pedal 11 with different quantities and sizes of gears. The crank pedal 11 drives the front chain ring 142 to rotate and a controller controls the chain to change gear at the front chain ring. By any means, the rotary speed of the crank pedal is equal to that of the front chain ring and to that of the chain. The rotary speed of the chain is not faster than that of the crank pedal for the speed change and acceleration effects.

SUMMARY OF THE INVENTION

It is a primary objective of the present invention to modify the foregoing front chain ring such that the rotary speed of the chain can be much faster than that of the crank pedal for a speed change effect.

A bicycle speed change sprocket module comprises a fixed star gear having a ratchet formed at its internal periphery, a plate having an axle hole at the center and one side of the plate is coaxially coupled with the axle hole, and the axle hole and an axle housing are provided for pivotally coupled with a crank; a freewheel sprocket, pivotally coupled on the axle housing and forming a ratchet on its external periphery; at least two planet gears axially and rotably coupled to one side of the plate, and the two planet gears coaxially disposed between the freewheel sprockets; and a chain engaged jointly by at least one chain wheel and the freewheel sprocket.

DETAILED DESCRIPTION OF THE PREFERRED EMBODIMENTS

Figure 3:
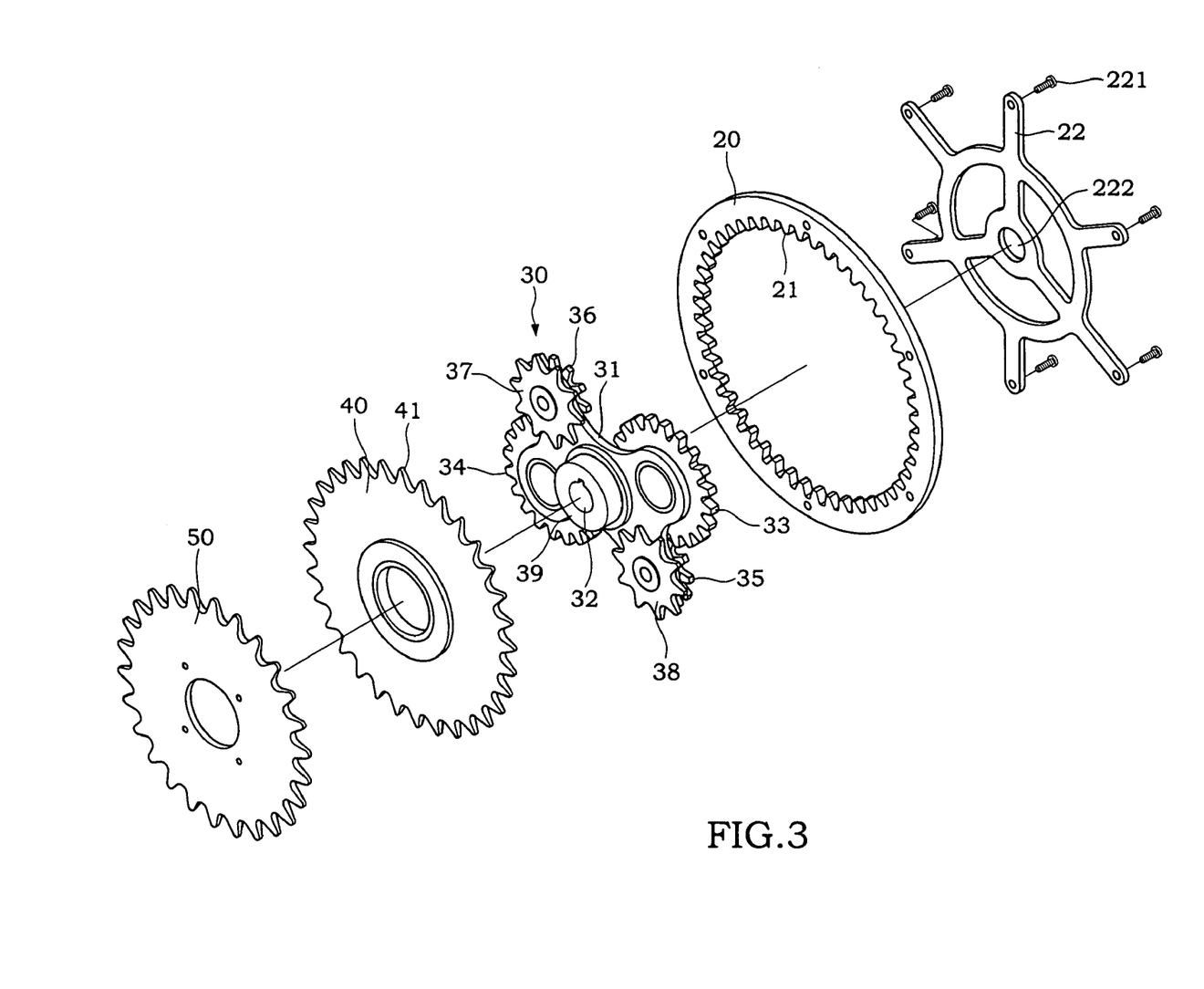
FIG. 3 is an exploded view of speed change sprocket of the present invention.
Figure 4:
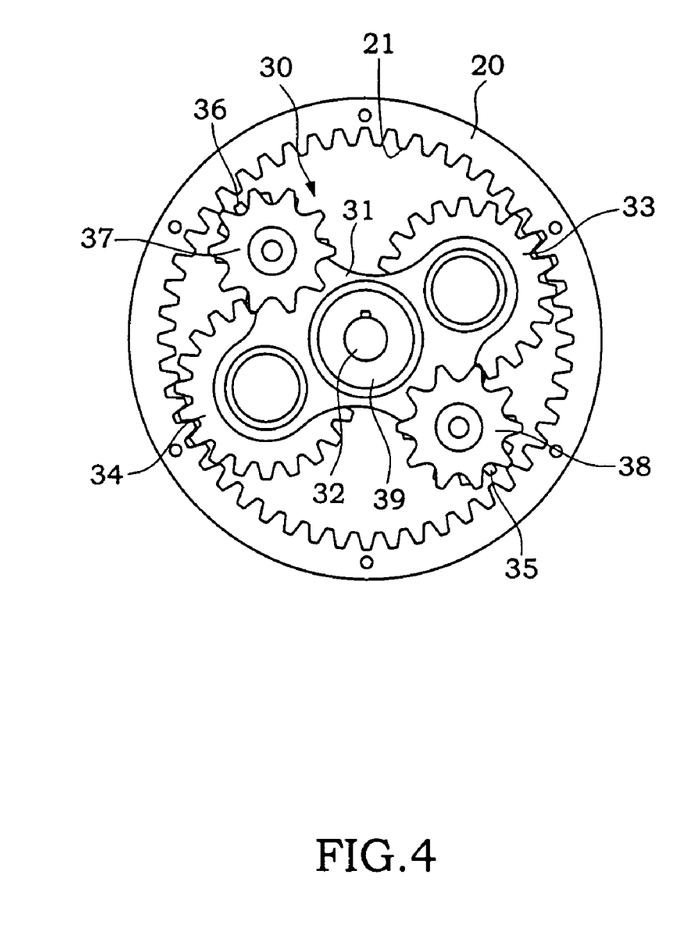
FIG. 4 is a front view of a planet gear and a fixed star gear in the speed change sprocket of the present invention.
Figure 5:
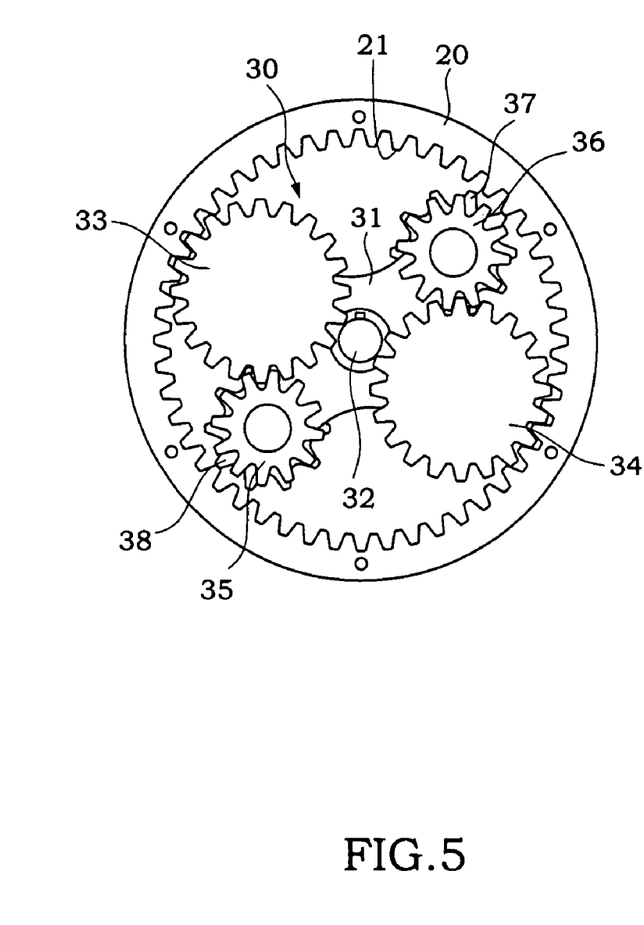
FIG. 5 is a rear view of combining a planet gear and a fixed star gear in the speed change sprocket of the present invention.

Referring to FIGS. 3 to 5, a bicycle speed change sprocket module of the present invention comprises:

a fixed star gear 20, having a ratchet 21 formed at its internal periphery;

a rear guard 22, disposed on one side of the fixed star gear 20 and its periphery being fixed onto the periphery of the fixed star gear 20 by a plurality of fixtures 221 and having an axle hole 222 at its center;

a planet gear sprocket module 30 as shown in FIGS. 4 and 5, comprising a plate 31 with an internal diameter smaller then the fixed star gear 29; an axle hole 32 disposed at the center of the plate 32; at least two planet gears 33, 34 axially and rotably coupled on one side of the plate 31, and the centers of the two planet gears 33, 34 are linear with the center of the axle hole 32 of the plate 31, and some part of the gear of the two planet gears 33, 34 is protruded from the plate 31 to engage with the ratchet 21 of the fixed star gear 20; at least two transmission gears 35, 36 respectively engaged with the two planet gears 33, 34 and axially and rotably disposed on a side of the plate 31; at least two chain wheels 37, 38 coaxially coupled with the two transmission gears 35, 36 and disposed on another side of the plate 31, and an axle housing 39 being disposed at the axle hole 32 of the plate 31 on the same side of the two transmission gears 35, 36;

a freewheel sprocket 40, pivotally coupled onto the axle housing 39 and having a ratchet 41 on its external periphery; and a start wheel 50, pivotally coupled to an external side of the freewheel sprocket 40 on the axle housing 39.

Figure 6:
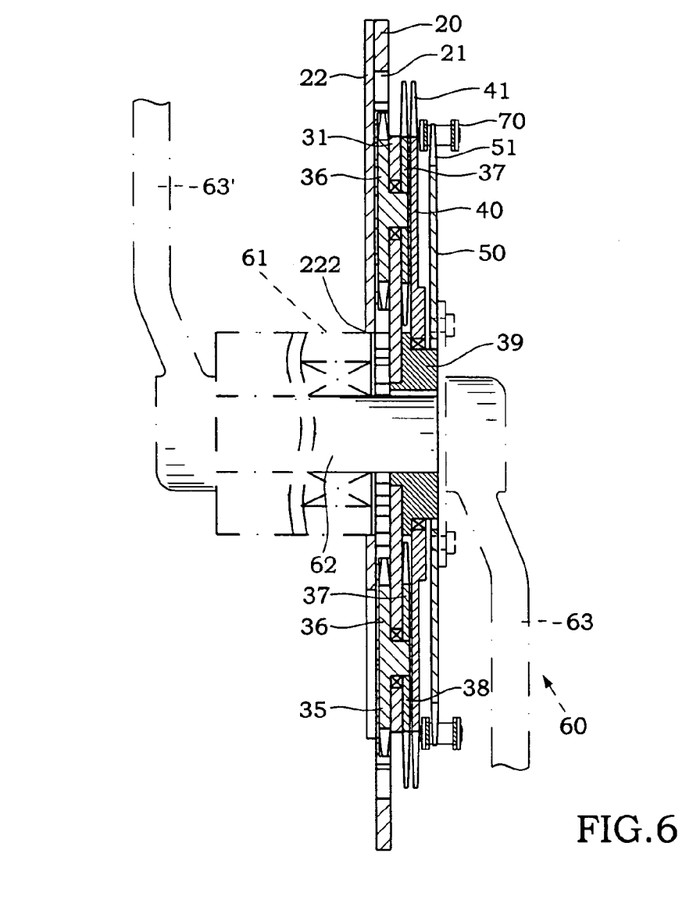
FIG. 6 is a perspective view of a speed change sprocket being installed onto a bicycle crank pedal and a chain being wound around a startup wheel according to the present invention.
Figure 7:
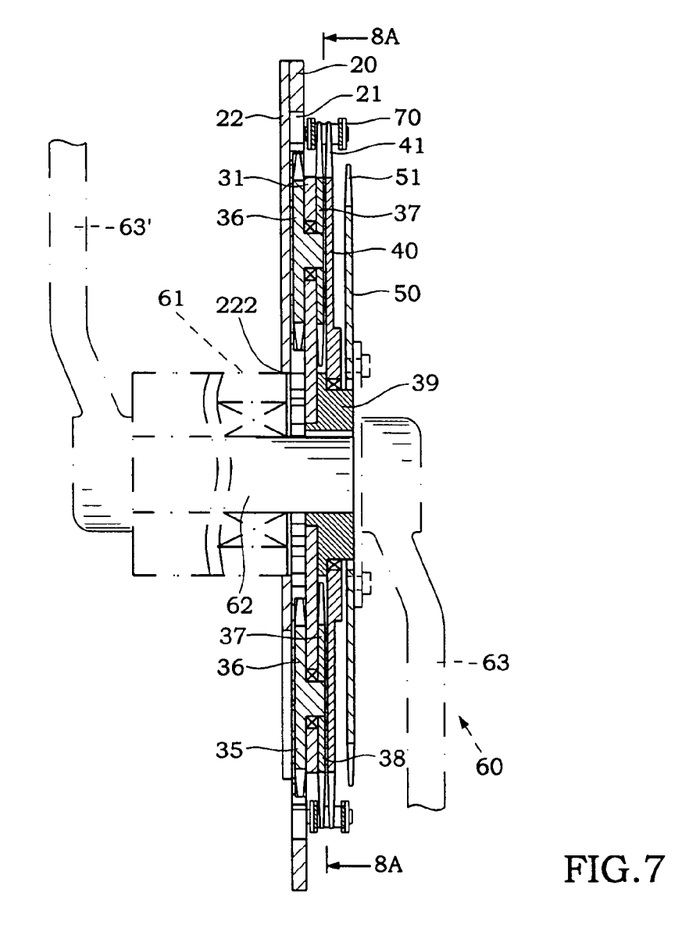
FIG. 7 is a cross-sectional view of a speed change sprocket being installed onto a bicycle crank pedal and a chain being wound around a freewheel sprocket and a chain wheel according to the present invention.

Referring to FIGS. 6 and 7, the foregoing components pivotally coupled to the axle hole 222 of the rear wheel guard 22 are mounted onto an external axial pipe 61 of a prior art bicycle crank pedal 60 which is a fixed part. The internal axle 62 of the crank pedal 60 is fixed into the axle hole 32 and the axle housing 39 of the plate 31. Each of both ends is connected to a crank 63, 63', and one of the cranks is fixed to the start wheel 50 by a fixture 631. Therefore, the crank 63 drives the start wheel 50 and the plate 31 to rotate. A prior art bicycle chain 70 is controlled by a prior art bicycle front wheel speed change device (not shown in the figure) to hang on the start wheel 50 or the freewheel sprocket 40. If the chain 70 is hung on the freewheel sprocket, the freewheel sprocket 40 and at least one chain wheel 37, 38 will be jointly engaged with the chain 70.

The plate 31 is driven to rotate by the crank 63. Since two planet gears 33, 34 on one side of the plate 31 are engaged with the ratchet 21 of the fixed star gear 20, therefore the planet gears 33, 34 have both revolution (rotating around the fixed star gear 20) and rotation. The two transmission gears 35, 36 are engaged with the planet gears 33, 34 respectively, and thus the revolution of the planet gear 33, 34 drives the transmission gears 35, 36 to rotate. The two chain wheels 37, 38 are coaxial with the transmission gears 35, 36, and thus the two chain wheels 37, 38 are also driven to rotate, and the chain 70 wound around the chain wheels 37, 38 is also driven to rotate. The rotating chain 70 further drives the freewheel sprocket 40, such that the inertia of the rotation of the chain provided by the freewheel sprocket 40 maintains the movement action for the chain 70.

Figure 8A:
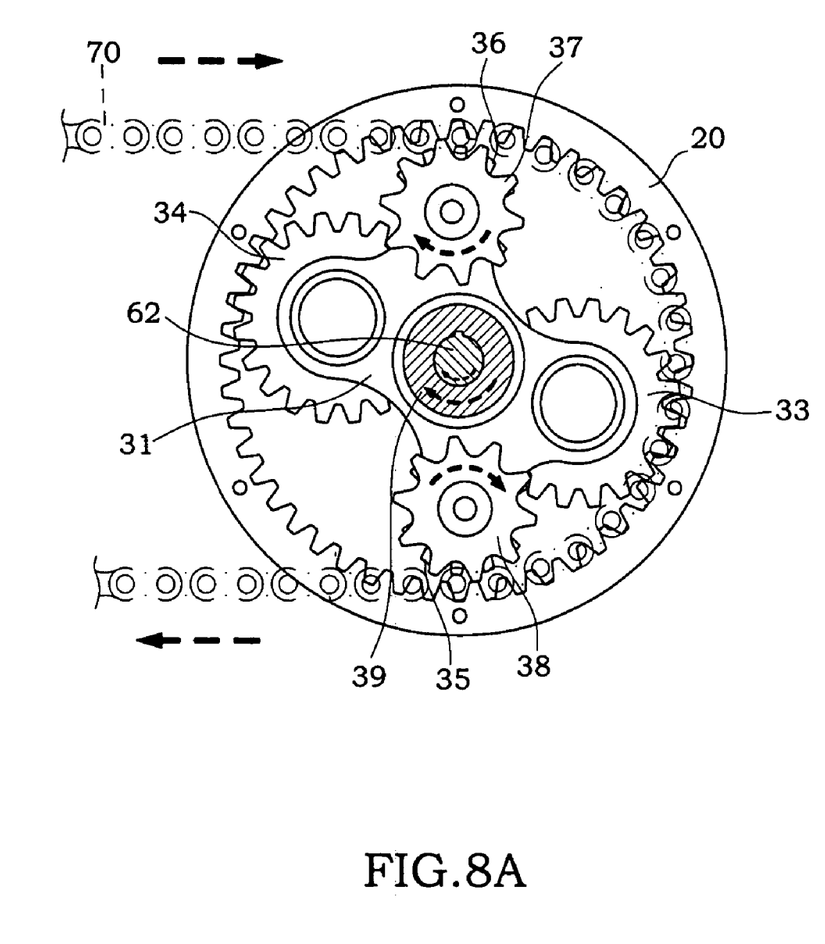
FIG. 8A is a cross-sectional view of Section 8A-8A as depicted in FIG. 7 and also a schematic view of the speed change sprocket driving the chain to rotate according to the present invention.
Figure 8B:
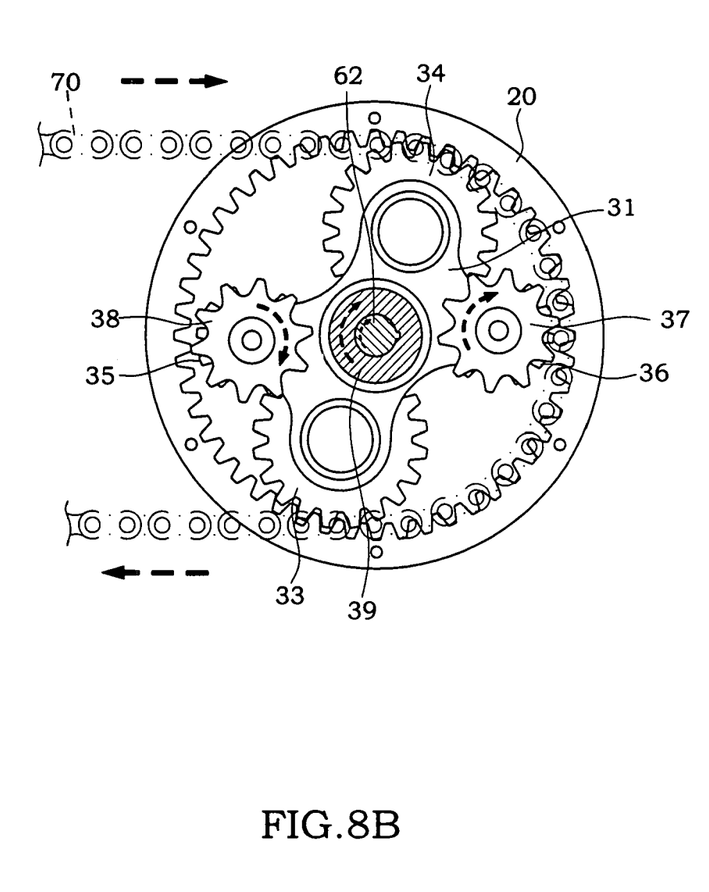
FIG. 8B is a schematic view of the speed change sprocket driving the chain to rotate along the movement as depicted in FIG. 8A.
Figure 8C:
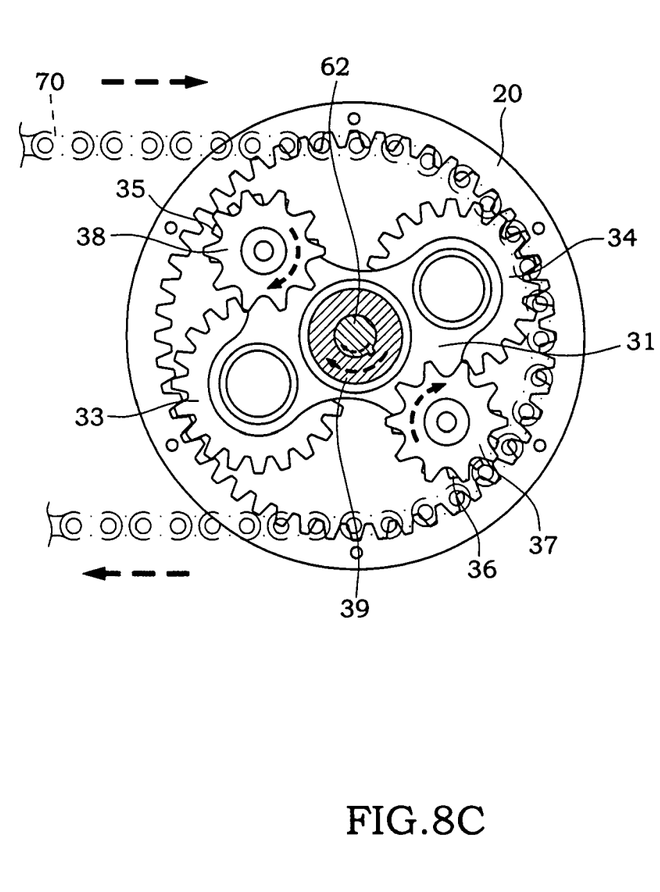
FIG. 8C is a schematic view of the speed change sprocket driving the chain to rotate along the movement as depicted in FIG. 8B.

Referring to FIGS. 8A, 8B and 8C, the present invention comprises at least two chain wheels 37, 38, and the centers of the two chain wheels 37, 38 are linear with the axle hole 32 of the plate 31 to assure the engagement between the chain wheel 37 and the chain 70. In FIG. 9A, the two chain wheels 37, 38 will be engaged with the chain 70 when they are rotated to the 12 o'clock and 6 o'clock directions. In FIG. 9B, if the two chain wheels 37, 38 are rotated to the 3 o'clock and 9 o'clock direction, then the chain wheel 37 in the 3 o'clock direction will be engaged with the chain 70. In FIG. 9C, if the two chain wheels 37, 38 are rotated to the 10 o'clock and 4 o'clock directions, then the chain wheel 37 in the 4 o'clock direction will be engaged with the chain 70.

The foregoing structure and movements of the present invention makes the rotary speed of the chain 70 faster than that of the crank pedal 60. For simplicity, we assume that the fixed star gear 40 is a 40-tooth gear; the planet gears 33, 34 are 20-tooth gear; the transmission gears 35, 36 are 12-tooth gears; and the chain wheels 37, 38 are 10-tooth wheels. If the crank pedal 60 rotates a round and the planet gears 33, 34 revolve around the fixed gear 20 for a round, then the planet gears 33, 34 will rotate about 2.4 rounds; the transmission gears 35, 36 will rotate about 3.8 rounds; the chain wheels 37, 38 also will rotate 3.8 rounds. The rotary speed of the chain wheels 37, 38 is faster than that of the crank pedal 60, and the speed of the chain 70 driven by the chain wheels 37, 38 is faster than the rotary speed of the crank pedal 60, and thus improving the bicycle speed. Once the planet gear sprocket module 30 reaches a certain speed to produce an inertia, the control of the crank pedal by the freewheel sprocket 40 becomes more power saving.

The foregoing chain 70 is controlled by a prior art front wheel speed change device (not shown in the figure) to switch the chain onto the start wheel 50 or the freewheel sprocket 40. In general, the chain is engaged to the start wheel 50 for a low speed pedaling of the crank pedal 60 or for starting the rotation of the chain from an idle position, so that a user can pedal the crank pedal 60 slowly with a little force. Once the chain 70 and the planet gear sprocket module 30 reach certain rotary speeds, the chain 70 is switched to the freewheel sprocket 40 and the chain wheels 37, 38. The rotary speed of the chain 70 is increased to achieve a speed change effect.

In summation of the above description, the present invention herein complies with the patent application requirements and is submitted for patent application. However, the description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A bicycle crane speed change sprocket module, said speed change sprocket module having a center for pivotally coupling a crank axle, and said crank axle being driven by both ends of a crank to rotate at an external axle pipe; said speed change sprocket module further driving a chain, and said chain being controlled by a front wheel speed change device to switch on two adjacent gears, and said speed change sprocket module comprising:

a fixed star gear, having a ratchet at its internal periphery and a center for passing said crank axle, and said fixed star gear being a fixed part not driven to rotate by said crank axle;

a plate, having a center pivotally coupled to said crank axle and being a rotary part driven to rotate by said crank axle;

at least two planet gears, axially and rotably disposed on one side of said plate, and said planet gears being engaged with a ratchet of said fixed star gear;

at least two chain wheels, having a tooth number smaller than that of said two planet gears, and being driven to rotate by said two planet gears, and the rotary speed of said chain wheel is faster than that of said planet gear; and a freewheel sprocket, freely and rotably coupled with said crank axle and being proximate to said two chain wheels, and said freewheel sprocket having a ratchet at its external periphery for engaging said chain onto said two chain wheels, and said chain being engaged with at least one of said chain wheels.

2. The bicycle crane speed change sprocket module of claim 1, further comprising at least two transmission wheel having a small tooth number than said planet gear, and respectively engaged with said two planet gears and axially and rotably disposed on one side of said plate, and said two chain wheels and said two transmission gears rotate coaxially.

3. The bicycle crane speed change sprocket module of claim 1, further comprising a start wheel with its center pivotally coupled to said crank axle and being proximate to said freewheel sprocket, and said chain being controlled by said front wheel speed change device and switched by said freewheel sprocket onto said start wheel.

4. The bicycle crane speed change sprocket module of claim 1, wherein said plate has a size smaller than the internal diameter of said fixed star gear.

5. The bicycle crane speed change sprocket module of claim 1, wherein said two planet gears have part of their teeth protruded from said plate to engage with said ratchet of said fixed star gear.

6. The bicycle crane speed change sprocket module of claim 1, further comprising a rear wheel guard fixed to said fixed star gear on an opposite side to said plate.

7. The bicycle crane speed change sprocket module of claim 6, wherein said rear wheel guard has an axle hole pivotally coupled with said external axle pipe, such that said fixed star gear becomes a fixed part.

8. The bicycle crane speed change sprocket module of claim 1, wherein said two planet gears have their centers aligned linearly with the center of said crank axle.

9. The bicycle crane speed change sprocket module of claim 1, wherein said two chain wheels have centers aligned linearly with the center of said crank axle.

10. A bicycle crane speed change sprocket module, said speed change sprocket module having a center for pivotally coupling a crank axle, and said crank axle being driven by both ends of a crank to rotate at an external axle pipe; said speed change sprocket module further driving a chain, and said chain being controlled by a front wheel speed change device to switch on two adjacent gears, and said speed change sprocket module comprising:

a fixed star gear, having a ratchet at its internal periphery and a center for passing said crank axle, and said fixed star gear being a fixed part not driven to rotate by said crank axle;

a plate, having a center pivotally coupled to said crank axle and being a rotary part driven to rotate by said crank axle;

at least two planet gears, axially and rotably disposed on one side of said plate, and said planet gears being engaged with a ratchet of said fixed star gear;

at least two chain wheels, having a tooth number smaller than that of said two planet gears, and being driven to rotate by said two planet gears, and the rotary speed of said chain wheel is faster than that of said planet gear;

a freewheel sprocket, freely and rotably coupled with said crank axle and being proximate to said two chain wheels, and said freewheel sprocket having a ratchet at its external periphery for engaging said chain onto said two chain wheels, and said chain being engaged with at least one of said chain wheels;

a start wheel, having its center pivotally coupled to said crank axle and being proximate to said freewheel sprocket, and said chain being controlled by said front wheel speed change device to be engaged with said freewheel sprocket and said start wheel.

11. The bicycle crane speed change sprocket module of claim 10, further comprising at least two transmission wheel having a small tooth number than said planet gear, and respectively engaged with said two planet gears and axially and rotably disposed on one side of said plate, and said two chain wheels and said two transmission gears rotate coaxially.

12. The bicycle crane speed change sprocket module of claim 10, wherein said plate has a size smaller than the internal diameter of said fixed star gear.

13. The bicycle crane speed change sprocket module of claim 10, wherein said two planet gears have part of their teeth protruded from said plate to engage with said ratchet of said fixed star gear.

14. The bicycle crane speed change sprocket module of claim 10, further comprising a rear wheel guard fixed to said fixed star gear on an opposite side to said plate.

15. The bicycle crane speed change sprocket module of claim 14, wherein said rear wheel guard has an axle hole pivotally coupled with said external axle pipe, such that said fixed star gear becomes a fixed part.

16. The bicycle crane speed change sprocket module of claim 10, wherein said two planet gears have their centers aligned linearly with the center of said crank axle.

17. The bicycle crane speed change sprocket module of claim 10, wherein said two chain wheels have centers aligned linearly with the center of said crank axle.

\* \* \* \* \*